(12) United States Patent
Wu et al.

(10) Patent No.: US 11,874,866 B2
(45) Date of Patent: *Jan. 16, 2024

(54) MULTISCALE QUANTIZATION FOR FAST SIMILARITY SEARCH

(71) Applicant: Google LLC, Mountain View, CA (US)

(72) Inventors: Xiang Wu, Piscataway, NJ (US); David Simcha, Jersey City, NJ (US); Daniel Holtmann-Rice, New York, NY (US); Sanjiv Kumar, Jericho, NY (US); Ananda Theertha Suresh, New York, NY (US); Ruiqi Guo, Elmhurst, NY (US); Xinnan Yu, Forest Hills, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,376

(22) Filed: Dec. 14, 2022

(65) Prior Publication Data
US 2023/0123941 A1 Apr. 20, 2023

Related U.S. Application Data

(63) Continuation of application No. 16/638,802, filed as application No. PCT/US2018/032550 on May 14, 2018, now Pat. No. 11,531,695.
(Continued)

(51) Int. Cl.
*G06F 16/33* (2019.01)
*G06F 16/31* (2019.01)
*G06N 20/00* (2019.01)

(52) U.S. Cl.
CPC ........ *G06F 16/3347* (2019.01); *G06F 16/313* (2019.01); *G06F 16/319* (2019.01); *G06N 20/00* (2019.01)

(58) Field of Classification Search
CPC ... G06F 16/3347; G06F 16/313; G06F 16/319
(Continued)

(56) References Cited

U.S. PATENT DOCUMENTS 5,297,170 A 3/1994 Eyuboglu et al.
5,903,676 A * 5/1999 Wu .................. G06T 9/004
341/51

(Continued)

OTHER PUBLICATIONS

Kalantidis et al. "Locally Optimized Product Quantization for Approximate Nearest Neighbor Search", IEEE Conference on Computer Vision and Pattern Recognition, Jun. 24-27, 2014, Columbus, Ohio, 8 pages (Year: 2014).*
(Continued)

*Primary Examiner* — Kimberly L Wilson
(74) *Attorney, Agent, or Firm* — Dority & Manning, P.A.

(57) ABSTRACT

The present disclosure provides systems and methods that include or otherwise leverage use of a multiscale quantization model that is configured to provide a quantized dataset. In particular, the multiscale quantization model can receive and perform vector quantization of a first dataset. The multiscale quantization model can generate a residual dataset based at least in part on a result of the vector quantization. The multiscale quantization model can apply a rotation matrix to the residual dataset to generate a rotated residual dataset that includes a plurality of rotated residuals. The multiscale quantization model can perform reparameterization of each rotated residual in the rotated residual dataset into a direction component and a scale component. The multiscale quantization model can perform product quantization of the direction components of the plurality of rotated residuals, and perform scalar quantization of the scale components of the plurality of rotated residuals.

20 Claims, 10 Drawing Sheets

Related U.S. Application Data

(60) Provisional application No. 62/549,094, filed on Aug. 23, 2017.

(58) Field of Classification Search
USPC .......................................................... 707/706
See application file for complete search history.

(56) References Cited

U.S. PATENT DOCUMENTS

| | | | |
|---|---|---|---|
| 10,131,052 B1* | 11/2018 | Ibarz Gabardos | ....... G06N 3/00 |
| 2017/0132511 A1* | 5/2017 | Gong | .................. G06N 3/0464 |
| 2018/0192066 A1* | 7/2018 | Haimi-Cohen | ...... H04N 19/146 |

OTHER PUBLICATIONS

Andoni et al., "Practical and Optimal LSH for Angular Distance", arXiv:2509v1, Sep. 9, 2015, 21 pages.

Andre et al., "Cache Locality is Not Enough: High Performance Nearest Neighbor Search with Product Quantization Fast Scan", Very Large Data Base Endowment, vol. 9, No. 4, pp. 288-299.

Babenko et al., "Additive Quantization for Extreme Vector Compression", Conference on Computer Vision and Pattern Recognition, Columbus, Ohio, Jun. 23-28, 2014, pp. 931-938.

Babenko et al., "Efficient Indexing of Billion-Scale Datasets of Deep Descriptors", Conference on Computer Vision and Pattern Recognition, 2016, pp. 2055-2063.

Babenko et al., "The Inverted Multi-Index", Conference on Computer Vision and Pattern Recognition, 2014, 14 pages.

Babenko et al., "Tree Quantization for Large-Scale Similarity Search and Classification", Conference on Computer Vision and Pattern Recognition, Boston, Massachusetts, Jun. 7-12, 2015, pp. 4240-4248.

Bentley, "Multidimensional Binary Search Trees Used for Associative Searching", Communications of the Association for Computing Machinery, 1975, pp. 509-517.

Dasgupta et al., "Random Projection Trees and Low Dimensional Manifolds", Technical Report, Department of Computer Science and Engineering, University of California, 29 pages.

Douze et al., "Polysemous Codes", arXiv:1609v2, Oct. 10, 2016, 18 pages.

Ge et al., "Optimized Product Quantization", Institute of Electrical and Electronics Engineers Transactions on Pattern Analysis and Machine Intelligence, vol. 36, No. 4, Apr. 2014, 12 pages.

Gong et al., "Iterative Quantization: A Procrustean Approach to Learning Binary Codes for Large-Scale Image Retrieval", Institute of Electrical and Electronics Engineers Transactions on Pattern Analysis and Machine Intelligence, vol. 35, No. 12, Dec. 2013, 15 pages.

Gray, "Vector Quantization", American Society of Safety Provisionals Magazine, vol. 1, No. 2, 1984, 26 pages.

Guo et al., "Quantization based Fast Inner Product Search", International Conference on Artificial Intelligence and Statistics, May 7-11, 2016, Cadiz, Spain, pp. 482-490.

He et al., "K-means Hashing: An Affinity-Preserving Quantization Method for Learning Binary Compact Codes", Institute of Electrical and Electronics Engineers Conference on Computer Vision and Pattern Recognition, Jun. 23-28, 2013, Portland, OR, pp. 2938-2945.

Heo et al., "Spherical Hashing", Institute of Electrical and Electronics Engineers Conference on Computer Vision and Pattern Recognition, Jun. 16-21, 2012, Providence, Rhode Island, 8 pages.

Indyk et al., "Approximate Nearest Neighbors: Towards Removing the Curse of Dimensionality", Proceedings of the Thirtieth Annual ACM Symposium on Theory of Computing, May 1998, 20 pages.

International Search Report and on Patentability for PCT/US2018/032550, dated Mar. 5, 2020, 11 pages.

International Search Report and Written Opinion for PCT/US2018/032550, dated Sep. 18, 2018, 16 pages.

International Search Report for PCT/US2018/032550, dated Sep. 18, 2018, 4 pages.

Jegou et al., "Product Quantization for Nearest Neighbor Search", Institute of Electrical and Electronics Engineers Transactions on Pattern Analysis and Machine Learning. Volume 33, No. 1, 2011, 14 pages.

Johnson et al., "Billion-Scale Similarity Search with GPUs", arXiv:1702.08734v1, Feb. 28, 2017, 12 pages.

Kalantidis et al., "Locally Optimized Product Quantization for Approximate Nearest Neighbor Search", Institute of Electrical and Electronics Engineers Conference on Computer Vision and Pattern Recognition, Jun. 23, 2014, 8 pages.

Kingma et al., "Adam: A Method for Stochastic Optimization", arXiv:1412.6980v1. Dec. 22, 2014, 9 pages.

Kulis et al., "Learning to Hash with Binary Reconstructive Embeddings", Twenty-third Conference on Neural Information Processing Systems, Dec. 7-12, 2009, British Columbia, Canada, 9 pages.

Liu et al., "Hashing with Graphs", International Conference on Machine Learning, Jun. 28-Jul. 2, 2011, Bellevue, Washington, 8 pages.

Martinez et al., "Revisiting Additive Quantization", European Conference on Computer Vision,, Oct. 8-16, 2016, Amsterdam, The Netherlands, pp. 137-153.

Martinez et al., "Stacked Quantizers for Compositional Vector Compression", arXiv:1411.2173v1, Nov. 8, 2014, 8 pages.

Matsui et al., "PQTable: Fast Exact Asymmetric Distance Neighbor Search for Product Quantization using Hash Tables", Institute of Electrical and Electronics Engineers International Conference on Computer Vision, Dec. 7-13, 2015, Santiago, Chile, pp. 1940-1948.

Muja et al., "Scalable Nearest Neighbor Algorithms for High Dimensional Data", Institute of Electrical and Electronics Engineers Transactions on Pattern Analysis and Machine Intelligence, vol. 36, No. 11, Nov. 2014, pp. 2227-2240.

Norouzi et al., "Cartesian k-means", Institute of Electrical and Electronics Engineers Conference on Computer Vision and Pattern Recognition, Jun. 23-28, 2013, Portland, Oregon, pp. 3017-3024.

Norouzi et al., "Fast Search in Hamming Space with Multi-Index Hashing", Institute of Electrical and Electronics Engineers Transactions on Pattern Analysis and Machine Intelligence, vol. 36, No. 6, Jun. 2014, 8 pages.

Shrivastava et al., "Asymmetric LSH (ALSH) for Sublinear Time Maximum Inner Product Search (MIPS)", Twenty-eighth Conference on Neural Information Processing Systems, Dec. 8-13, 2014, Montreal, Canada, 9 pages.

Szegedy et al., "Going Deeper with Convolutions", Institute of Electrical and Electronics Engineers Conference on Computer Vision and Pattern Recognition, Jun. 8-12, 2015, Boston, Massachusetts, 9 pages.

Wang et al., "Hashing for Similarity Search: A Survey", arXiv:1408.2927v1, Aug. 13, 2014, 29 pages.

Wang et al., "Learning to Hash for Indexing Big Data—A Survey", arXiv:1509.05472v1, Sep. 17, 2015, 22 pages.

Weiss et al., "Spectral Hashing", Thirty-second Conference on Neural Information Processing Systems, Dec. 2-8, 2018, Montreal, Canada, 8 pages.

Zhang et al., "Composite Quantization for Approximate Nearest Neighbor Search", International Conference on Machine Learning, Jun. 21-26, 2014, Beijing, China, 9 pages.

Zhang et al., "Sparse Composite Quantization", Institute of Electrical and Electronics Engineers Conference on Computer Vision and Pattern Recognition, Jun. 8-12, 2015, Boston, Massachusetts, pp. 4548-4556.

\* cited by examiner

MULTISCALE QUANTIZATION FOR FAST SIMILARITY SEARCH

PRIORITY CLAIM

The present application is a continuation of U.S. application Ser. No. 16/638,802 having a filing date of Feb. 13, 2020, which is based upon and claims the right of priority under 35 U.S.C. § 371 to International Application No. PCT/US2018/032550 filed on May 14, 2018, which claims the benefit of priority of U.S. Provisional Patent Application No. 62/549,094 filed Aug. 23, 2017, entitled "Multiscale Quantization for Fast Similarity Search." Applicant claims priority to and the benefit of each of such applications and incorporate all such applications herein by reference in its entirety.

FIELD

The present disclosure relates generally to machine learning. More particularly, the present disclosure relates to performing multiscale quantization on a dataset using a multiscale quantization model, and training the multiscale quantization model with machine learning.

BACKGROUND

Large-scale similarity search is central to information retrieval and recommendation systems for images, audio, video, and textual information. For high dimensional data, several hashing based methods have been proposed, including randomized and learning-based techniques. Another set of techniques, based on quantization, have become popular recently due to their strong performance on real-world data. In particular, product quantization (PQ) and its variants have regularly claimed top spots on public benchmarks such as GIST-1M, SIFT-1B, and Deep-10M.

In product quantization, the original vector space is decomposed into a Cartesian product of lower dimensional subspaces, and vector quantization is performed in each subspace independently. Vector quantization (VQ) approximates a vector $x \in X \subset \mathbb{R}^d$ by finding the closest quantizer in a codebook C:

$$\phi_{VQ}(x; C) = \operatorname{argmin}_{c \in \{C_j\}} \|x - c\|_2$$

where $C \in \mathbb{R}^{dim(x) \times m}$ is a vector quantization codebook with m codes, and the j-th column $C_j$ represents the j-th quantizer. Similarly, product quantization (PQ) with K subspaces can be defined as:

$$\phi_{PQ}(x; S = \{S^{(k)}\}) = [\phi_{VQ}(x^{(1)}; S^{(1)}); \ldots ; \phi_{VQ}(x^{(K)}; S^{(K)})] \quad (1)$$

where $x^{(k)}$ denotes the subvector of x in k-th subspace, and $S^{(k)} \in \mathbb{R}^{dim(x^{(k)}) \times l}$ is a collection of K product quantization codebooks, each with l sub-quantizers.

Product quantization works well in large part due to the fact that it permits asymmetric distance computation, in which only dataset vectors are quantized while the query remains unquantized. This is more precise than techniques based on Hamming distances (which generally require hashing the query), while still being efficient to compute using lookup table operations.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for performing multiscale quantization. The multiscale quantization may be of a first dataset and may be to generate an encoding of the first dataset. The method includes performing a vector quantization of a first dataset. The method includes generating a residual dataset based at least in part on a result of the vector quantization. The method includes applying a rotation matrix to the residual dataset to generate a rotated residual dataset that includes a plurality of rotated residuals. The method includes performing reparameterization of each rotated residual in the rotated residual dataset into a direction component and a scale component. The method includes performing product quantization of the direction components of the plurality of rotated residuals, and performing scalar quantization of the scale components of the plurality of rotated residuals. The encoding of the first dataset may comprise searchable data representing the first data set.

The method may comprise performing, by the computing system, an approximate nearest neighbor search for a query relative to at least some of the quantized rotated residuals. Data representing the query may be received. For example, a user may input a data item as a query. The data item may be of a corresponding type to data items of the first dataset such that the user input data may be used to perform a search for one or more data items of the first dataset that correspond to the input data item, for example one or more data items that are most similar to the query data item. Performing, by the computing system, the approximate nearest neighbor search may comprise performing, by the computing system, an asymmetric search, and wherein performing, by the computing system, an asymmetric search comprises performing, by the computing system, scalar multiplication of a product quantizer codebook once per scalar quantizer. The multiscale quantization may therefore generate an encoding of the first dataset that can be more readily searched than the unencoded first dataset.

The first dataset may comprise a plurality of first data items. Each first data item may be associated with data selected from the group consisting of: an image, a text portion, a web document, audio, and video. For example, each data item may have an associated type selected from the group consisting of: an image, a text portion, a web document, audio, and video. In general, each data item in the first dataset has the same type and the first dataset may therefore represent a plurality of data items of a particular type for which it is desirable to perform a search.

Performing, by the computing system, reparameterization of each rotated residual comprises unit normalizing, by the computing system, each rotated residual to form the direction component for such rotated residual. Unit normalizing, by the computing system, each rotated residual to form the direction component for such rotated residual may comprise dividing, by the computing system, each rotated residual by its norm, and wherein the scale component for each rotated residual comprises its norm.

The product quantization may be given by a concatenation of codewords obtained by dividing the normalized residuals into one or more subvectors that are independently quantized by a plurality of vector quantizers. The quantized rotated residuals may be organized into blocks such that within a block all rotated residuals have the same quantized norm.

A diameter of the residual dataset may be smaller than a diameter of the first dataset.

The vector quantization of the first dataset may be based at least in part on a vector quantization codebook. The product quantization of the direction component may be based at least in part on a product quantization codebook. The scalar quantization may be based at least in part on a scalar quantization codebook.

Another example aspect of the present disclosure is directed to a computer-implemented method for performing machine learning. The method includes obtaining a quantization model that includes a vector quantizer, a rotation matrix, a product quantizer that employs one or more product quantization codebooks, and a scalar quantizer that employs a scalar quantizer codebook. The method includes determining a gradient of an objective function for one or more examples. The method includes jointly training the vector quantizer, the rotation matrix, the product quantizer, and the scalar quantizer based at least in part on the gradient of the objective function.

The product quantization codebook may be learned on unit-normalized residuals of a vector quantization. The method may further comprise initializing a vector quantization codebook using random samples from a dataset; and initializing the one or more product quantization codebooks using residuals of a vector quantized and rotated set of independent samples.

Jointly training the product quantizer and the scalar quantizer may comprise jointly optimizing an assignment of product quantization codes and a scalar quantization of residual norms for all datapoints within an individual vector quantization partition. Jointly optimizing the assignment of product quantization codes and the scalar quantization of residual norms for all datapoints within the individual vector quantization partition may comprise, iteratively and in an alternating fashion: fixing all assigned product quantization codes and scalar quantizing the residual norms only within the individual vector quantization partition; and fixing the quantized residual norms within the individual vector quantization partition and reassigning the product quantization codes. Jointly training, by the computing system, the vector quantizer, the rotation matrix, the product quantizer, and the scalar quantizer based at least in part on the gradient of the objective function comprises: performing a number of first training iterations to train the vector quantizer; and after performing the number of first training iterations, performing a number of second training iterations to jointly train vector quantizer, the rotation matrix, the product quantizer, and the scalar quantizer.

Another example aspect of the present disclosure is directed to a computer system. The computer system includes one or more processors, and one or more non-transitory computer-readable media that, when executed by the one or more processors, cause the computer system to perform operations. The operations include obtaining a dataset that includes a plurality of datapoints. The operations include performing reparameterization of each datapoint in the dataset into a direction component and a scale component. The operations include performing product quantization of the direction components of the datapoints, and performing scalar quantization of the scale components of the datapoints.

Obtaining the dataset that includes the plurality of datapoints may comprise: obtaining an original dataset; performing a vector quantization of the original dataset; generating a residual dataset based at least in part on a result of the vector quantization of the original dataset; applying, by the computing system, a rotation matrix to the residual dataset to generate a rotated residual dataset that includes a plurality of rotated residuals; and performing reparameterization of each datapoint in the dataset comprises performing reparameterization of each rotated residual included in the rotated residual dataset.

The operations may further comprise performing an approximate nearest neighbor search for a query relative to the at least some of the quantized datapoints.

Other aspects of the present disclosure are directed to various systems, apparatuses, non-transitory computer-readable media, user interfaces, and electronic devices. It will be appreciated that aspects may be combined such that features described in the context of one aspect may be implemented in the context of a further aspect. In each aspect the data may be associated with real-world data such as an image, a text portion, a web document, audio, and video.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

and the average squared norms is fixed $$\mu(\|x_i\|^2) = 1,$$

according to example embodiments of the present disclosure.

Figure 4A:
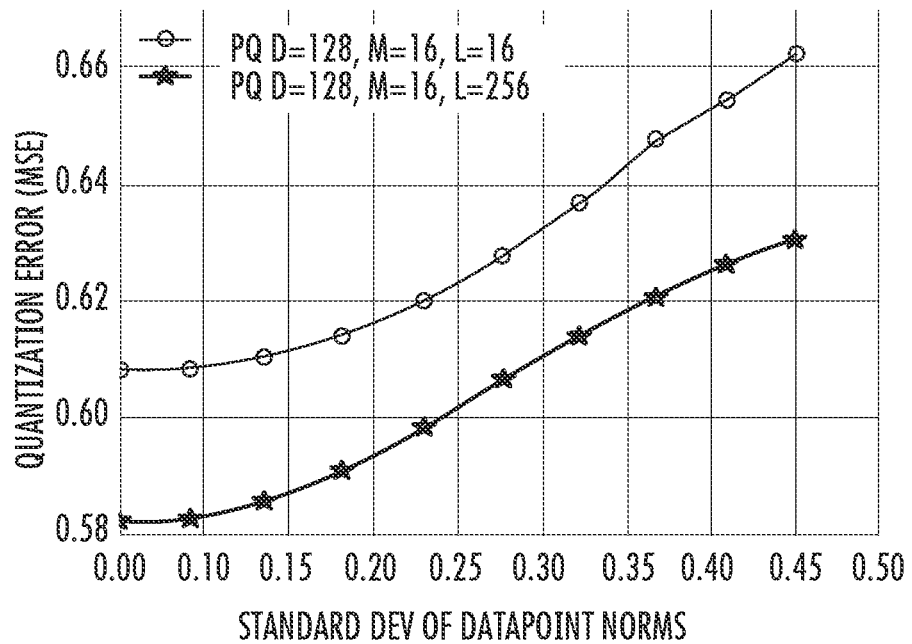
FIG. 4A depicts how PQ quantization error on a synthetic dataset $X \in \mathbb{R}^{d \times N}$ grows as the standard deviation of data point norms $\sigma(\|x\|_2)$ increases, where the mean of the dataset is zero $$\mu(X) = 0^{d \times 1},$$
Figure 4B:
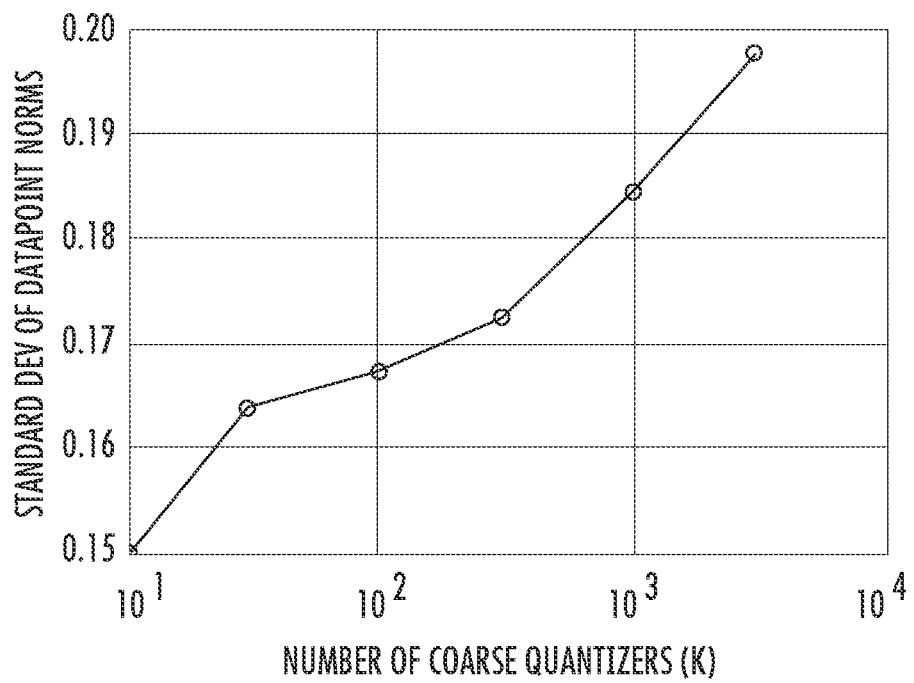

FIG. 4B depicts the standard deviation of vector (coarse) quantization residual norms on the realistic dataset of SIFT-1M, when the residual vectors are scaled so that the average squared norms is fixed to be $$\mu(\|x_i\|^2) = 1,$$

according to example embodiments of the present disclosure.

Figure 5A:
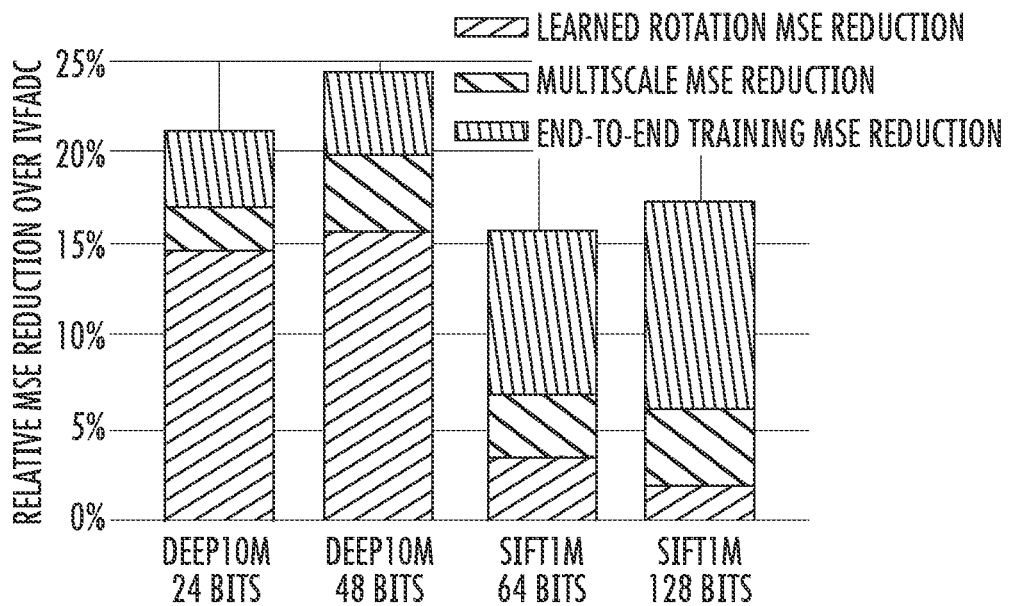

FIG. 5A depicts a break down by contribution to MSE reduction from each component in a multiscale quantization model on SIFT-1M and DEEP-10M datasets with different bitrates, where the baseline is the original IVFADC setup with no rotation or residual norm quantization, according to example embodiments of the present disclosure.

Figure 5B:
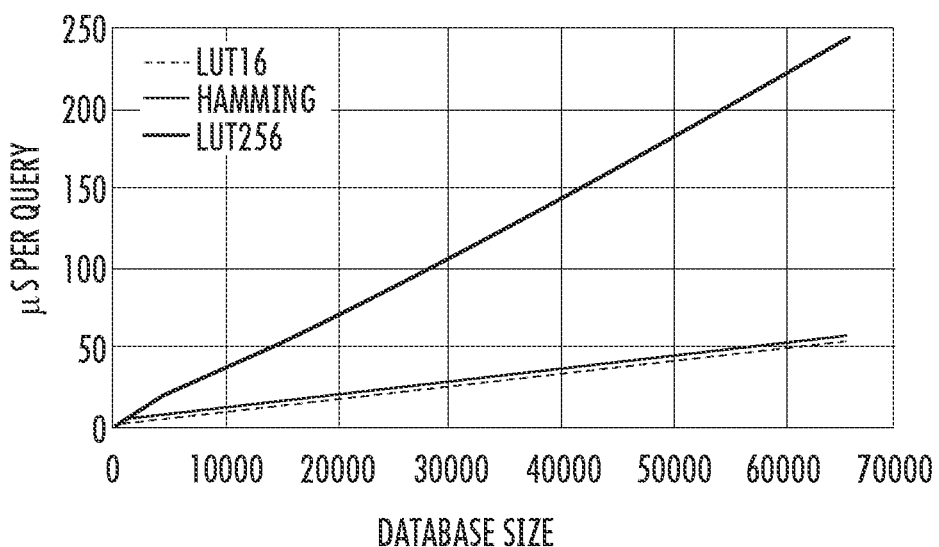

FIG. 5B depicts time spent per query by different distance computation methods on linear search of a database of size $|X|=2^7, 2^8, 2^9, \ldots 2^{16}$ under 128 bits, where lower curves indicate faster search time, according to example embodiments of the present disclosure.

Figure 6:
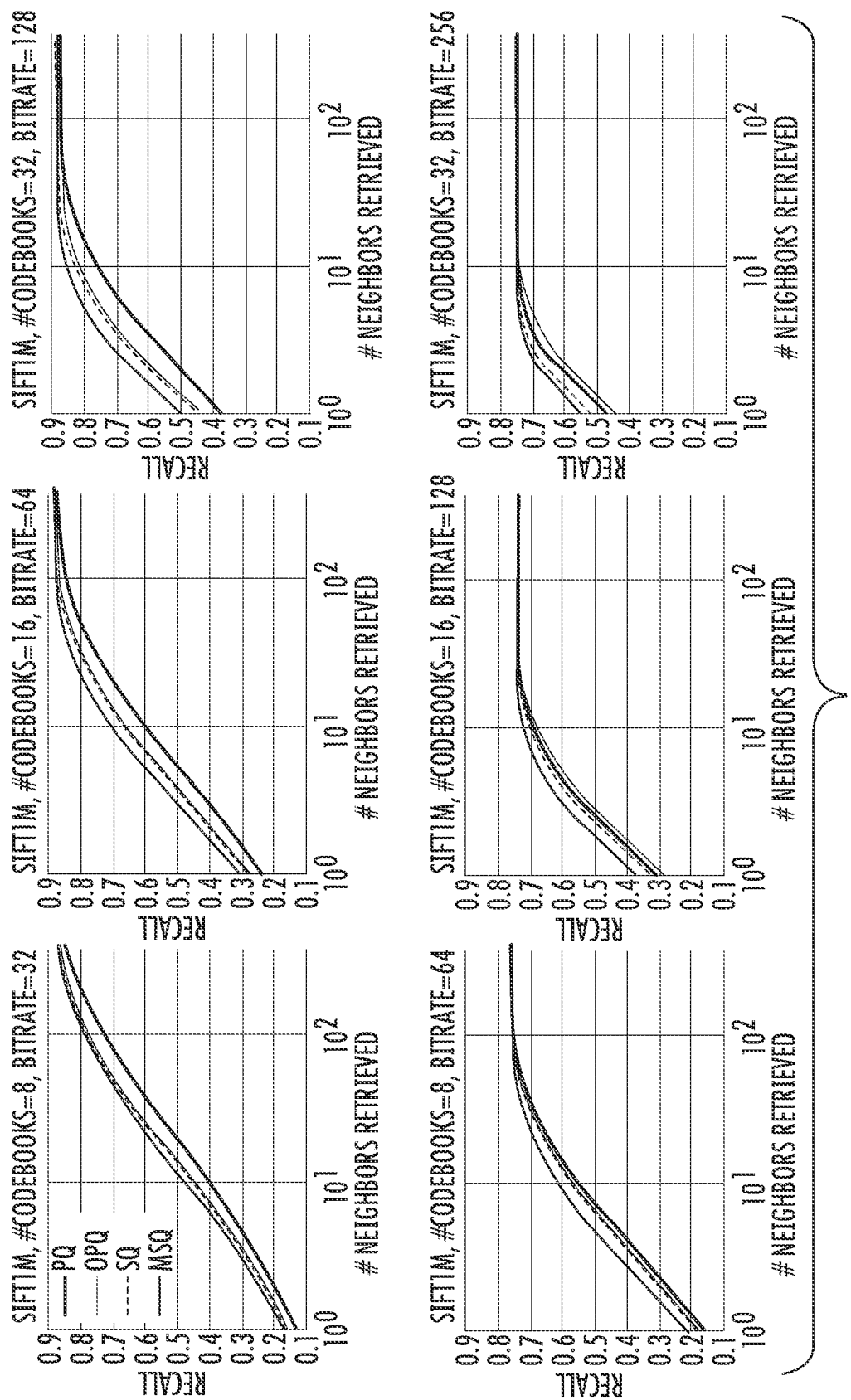

FIG. 6 depicts recall curves when retrieving Top-1 neighbors (Recall1@N) on the SIFT1M dataset with varying numbers of codebooks and centers, where t=8 out of m=1024 VQ partitions, according to example embodiments of the present disclosure.

Figure 7:
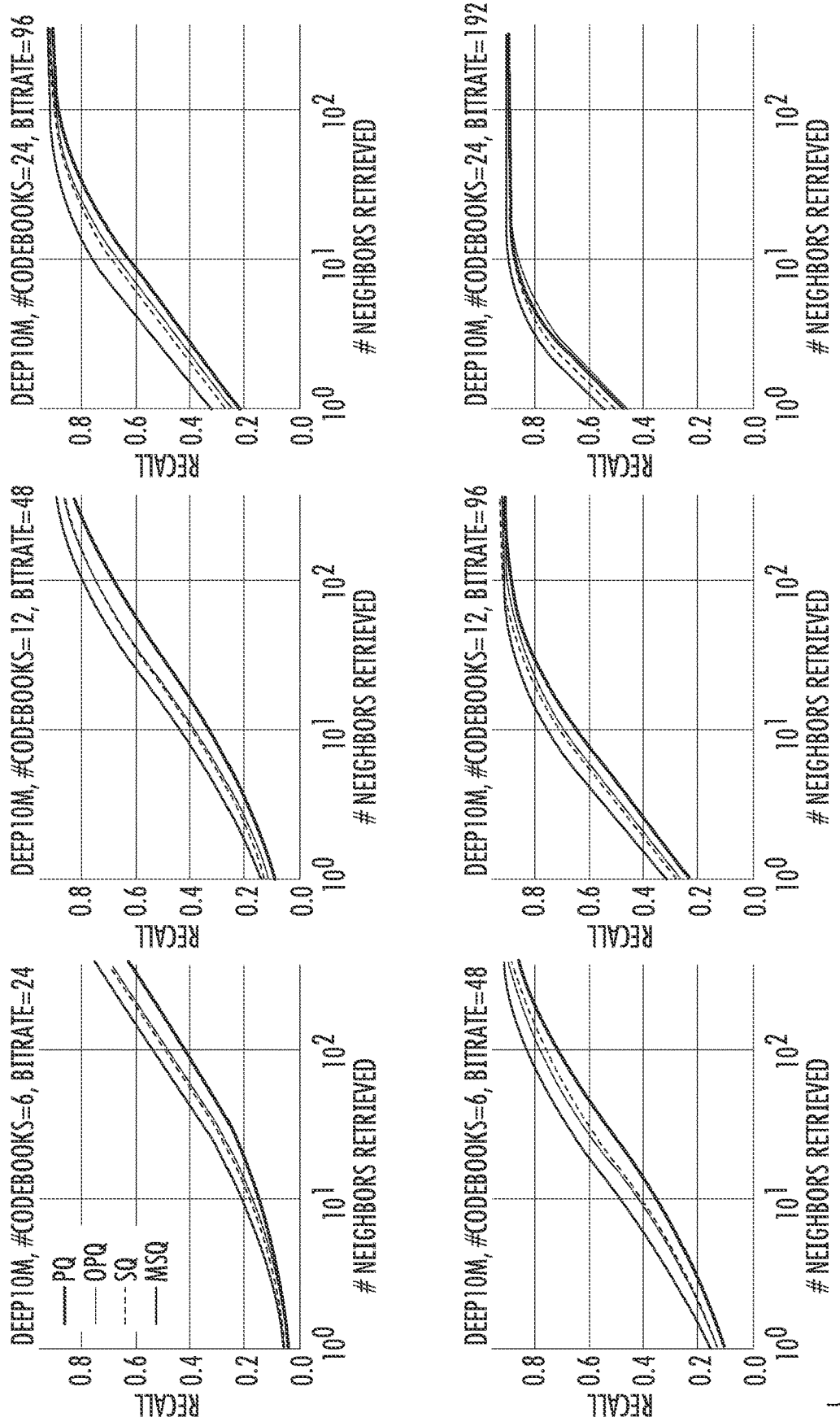

FIG. 7 depicts recall curves when retrieving Top-1 neighbors (Recall1@N) on the DEEP10M datasets varying numbers of codebooks and centers, where t=8 out of m=1024 VQ partitions, according to example embodiments of the present disclosure.

Figure 8:
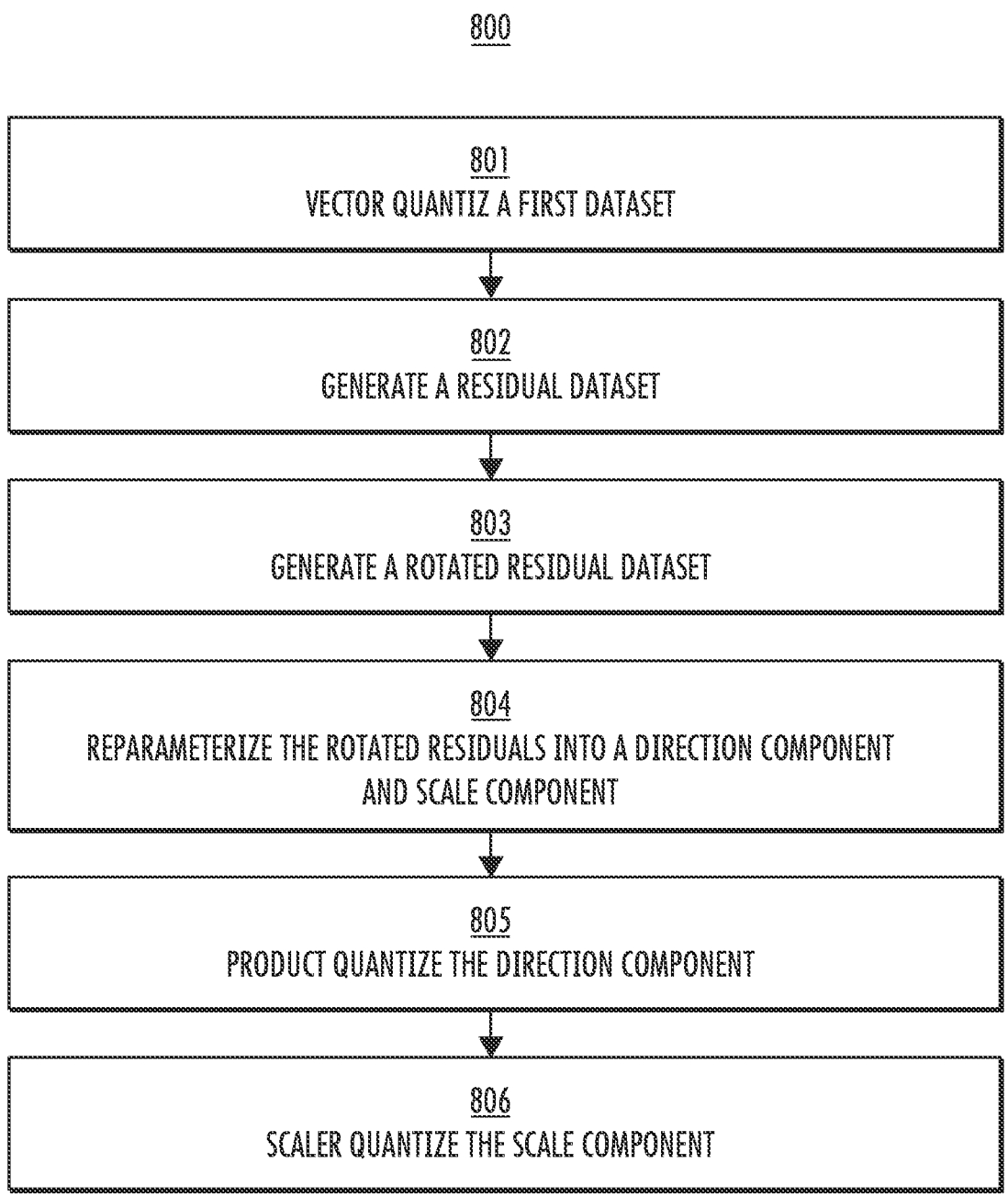
Figure 9:
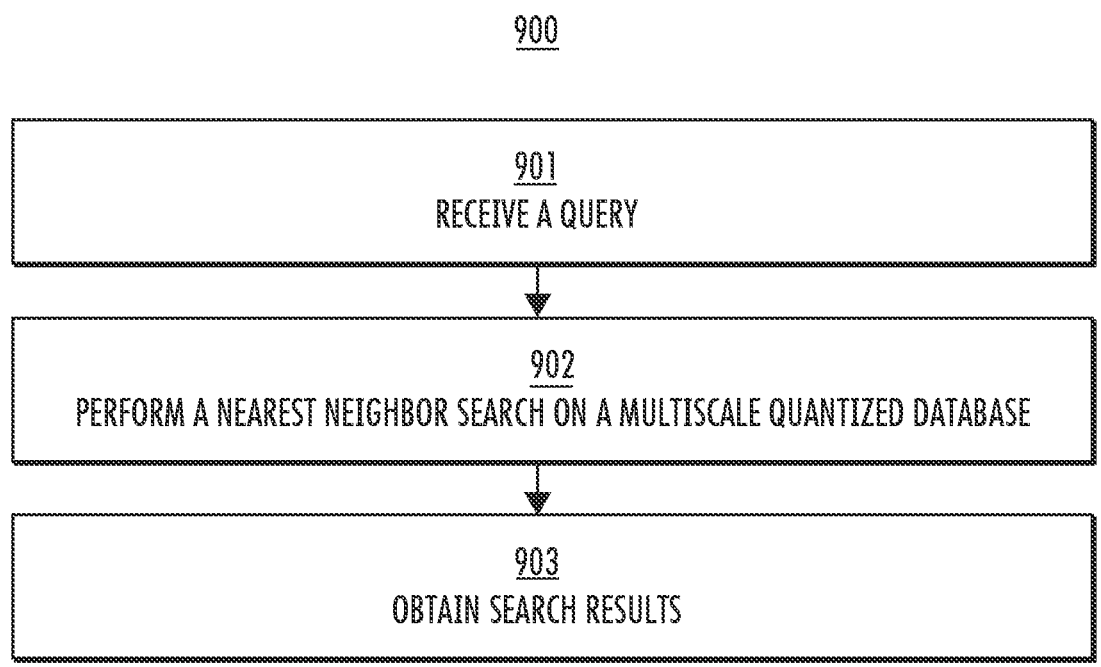
Figure 10:
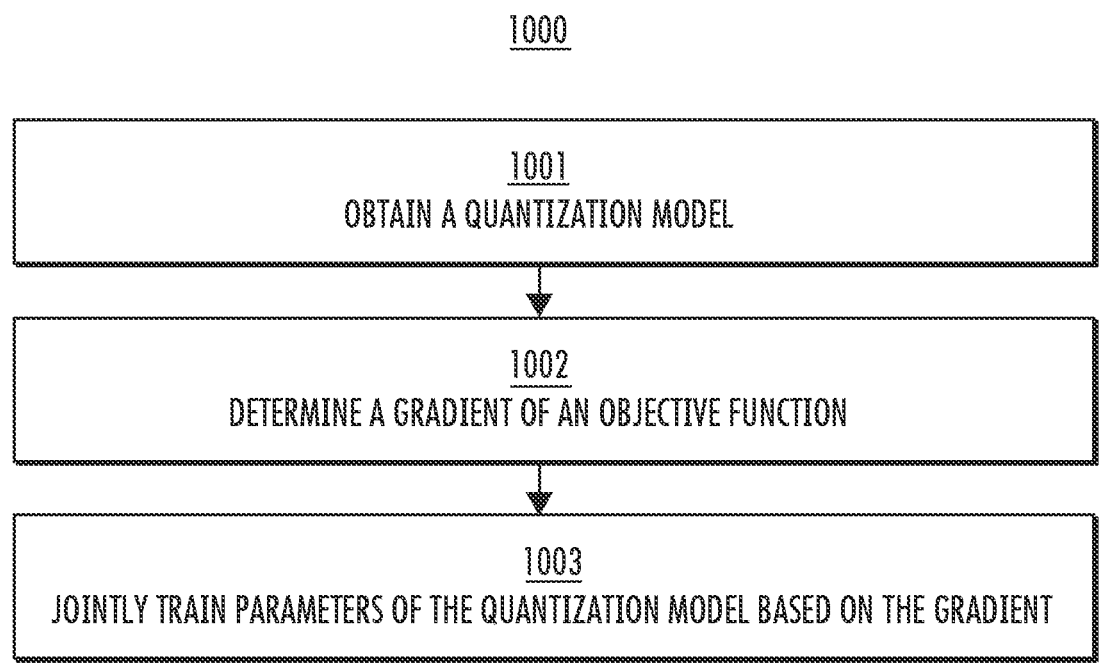

FIG. 8 depicts a flow diagram of an example method for multiscale quantization, in accordance with some implementations of the present disclosure;

FIG. 9 depicts a flow diagram of an example method for performing a fast similarity search using a multiscale quantization model, in accordance with some implementations of the present disclosure; and FIG. 10 depicts a flow diagram of an example method for training a multiscale quantization model, in accordance with some implementations of the present disclosure.

Reference numerals that are repeated across plural figures are intended to identify the same components or features in various implementations.

DETAILED DESCRIPTION

1. Introduction

Generally, the present disclosure is directed to systems and methods for performing multiscale quantization on a dataset (e.g., large, high-dimensional datasets). Quantization methods (e.g., product quantization) can be used for fast similarity search on large, high-dimensional datasets, but perform poorly when there is variance in a norm of the datapoints in the dataset. This is a common scenario for real-world datasets, especially when performing product quantization of residuals obtained from coarse vector quantization. The present disclosure enables a multiscale quantization model that can learn a separate scalar quantizer of the residual norms. The parameters of the multiscale quantization model can be learned jointly in a stochastic gradient descent framework. In this way, an overall quantization error can be minimized, and substantial improvements in recall can be realized. The multiscale quantization may therefore generate an encoding of a dataset that can be searched in an improved manner relative to the original dataset. Thus, in some implementations, the present disclosure provides a complete end-to-end training algorithm to learn coarse quantizers, a rotation matrix, and product quantization codebooks, together with scalar quantizers to capture coarse quantization residual norms. In this way, (a) variance in datapoint norms can be identified and addressed, (b) coarse quantizers can be included as part of the optimization, and (c) stochastic gradient descent can be used to perform end-to-end training, which leads to a significant improvement in quantization error compared to previous methods using alternating optimization.

More particularly, as described above, in product quantization, the original vector space is decomposed into a Cartesian product of lower dimensional subspaces, and vector quantization is performed in each subspace independently. Empirically, product quantization works best when the variance in each subspace is balanced. To ensure this, a rotation matrix is often applied to the data prior to performing quantization. This rotation can be either random or learned.

However, the quality of the product quantization codebook also degenerates when there is variance in the norms of the datapoints being encoded—even when the variance is relatively moderate. For example, one or more synthetic datasets can be generated such that: (1) the dataset mean is zero; (2) datapoint direction is chosen uniformly at random; and (3) the average squared norm of the datapoints is fixed. FIG. 4A shows a plot of quantization error (MSE) of product quantization against the standard deviation of the norms of the datapoints in the synthetic datasets. As shown in FIG. 4A, quantization error increases with the variance of the datapoint norms. As shown in FIG. 4B, in realistic settings, the residuals of a coarse vector quantization of the data also have highly varying norms.

According to an aspect of the present disclosure, to compensate for the case where there is variance in norms, the formulation of product quantization can be modified by separately scalar quantizing datapoint norms, and then unit-normalizing the datapoints before applying product quantization. When computing asymmetric distances, this simply requires a scalar multiplication of the PQ codebook once per scalar quantizer, which has negligible computational cost in practice.

To scale quantization based search techniques to massive datasets, a popular strategy is to first vector quantize the input vectors in the original space (coarse quantization), and then apply product quantization on the vector quantization residuals. However, in such a 'VQ-PQ' style approach, the norms of the residuals exhibit significant variance. Therefore, the proposed multiscale approach provides significant gains for massive search even when the original data is fully normalized.

Since an efficient asymmetric distance computation (ADC) was introduced and applied to the approximate nearest neighbor (ANN) search problem, there have been multiple lines of work focused on improving PQ.

For example, a coarse quantizer (also referred to as an inverted file indexing structure (IVF)) learns a vector quantization of the data points via clustering, using the cluster indices to form an inverted index storing all data points corresponding to a given cluster index consecutively. A data point is encoded via PQ codes associated with the residual (offset) of the data point from its closet cluster center. This design enables non-exhaustive search by searching only a subset of the M clusters/partitions in the inverted index. However, previous works have learned coarse quantizers as a separate preprocessing step, without training the coarse quantizers jointly with the PQ codebooks.

As another example, since PQ quantizes each subspace independently, a rotation matrix can be applied to reduce the intra-subspace statistical dependence. Researchers have proposed multiple ways to estimate such a rotation matrix (e.g., ITQ style alternating quantization, Optimized PQ, Locally Optimized PQ, etc.). While learning such orthogonal transformations is a good strategy in general, it does not change the norm of data points. Thus, it still suffers from norm variance.

As yet another example, research has focused on learning additive codebooks instead of subspace codebooks. This includes additive quantization, composite quantization, and stacked quantization. Since they do not work in subspaces, additive codebooks do not require rotation, although they are harder to learn and more expensive to encode. Empirically, such additive codebooks are more expressive, and outperform OPQ at lower bitrates. However, OPQ achieves similar performance at higher bitrates. Since additive codebooks do not address the variance of data point norms, the proposed multiscale approach could also be applied to additive codebooks.

As yet another example, much effort has been put into optimizing the implementation of ADC, as it is computationally critical (e.g., using Hamming distance for fast pruning, efficient GPU implementation for ADC lookup, using SIMD-based computation to compute lower bounds for ADC, etc.).

As yet another example, there is a large body of similarity search literature on non-quantization based methods in both inner product search and nearest neighbor search. Tree based methods, and locality sensitive hashing style algorithms focus on non-exhaustive search by partitioning the search space. In engineering practice, these often lead to random memory accesses, and are often combined with exhaustive methods in ways similar to IVFADC. Binary embedding based approaches focus on learning short binary codes, and can be searched efficiently in Hamming space. However, there is typically a large gap between the precision of distance computations in Hamming vs. product codes under the same bitrate, and ADC can be computed with similar speed.

In view of the above deficiencies, the present disclosure provides a complete end-to-end training algorithm to learn coarse quantizers, a rotation matrix, and product quantization codebooks, together with scalar quantizers to capture coarse quantization residual norms. In this way, (a) variance in datapoint norms can be identified and addressed, (b) coarse quantizers can be included as part of the optimization, and (c) stochastic gradient descent can be used to perform end-to-end training, which leads to a significant improvement in quantization error compared to previous methods using alternating optimization.

2. Example Methodology

Aspects of the present disclosure focus on minimizing a quantization error $\|x-\tilde{x}\|$, where x is a datapoint and $\tilde{x}$ is its quantized approximation, as a proxy for minimizing query-database distance approximation error $|\|q-x\|_2-\|q-\tilde{x}\|_2|$. In some implementations, quantization techniques can take a hierarchical approach. For example, one or more "coarse" quantization stages (VQ) can be followed by product quantization (PQ) of the vector quantization residuals. A learned rotation can be applied to the residuals prior to product quantization to further reduce quantization error.

The multiscale quantization model and associated techniques can include extending the 'VQ-PQ' strategy by explicitly representing the norm of VQ residuals, learning a PQ codebook only on the unit-normalized rotated VQ residuals, and separately scalar quantizing the residual norms. In this way, the variance of datapoint norms as an additional source of quantization error when performing product quantization can be addressed.

As an example, in some implementations, the multiscale quantization model can include: (1) vector quantization of the dataset; (2) learned rotation of the vector quantization residuals; (3) reparameterization of the rotated residuals into direction and scale components; (4) product quantization of the direction component; and (5) scalar quantization of the scale component.

Formally, in multiscale quantization a datapoint $x \in \mathbb{R}^d$ is approximated by $$x \approx \tilde{x} = \phi_{VQ}(x) + \phi_{SQ}(\|r_x\|)R^T \phi_{PQ}(\hat{r}_x), \hat{r}_x = \frac{r_x}{\|r_x\|}, r_x = R(x - \phi_{VQ}(x)) \quad (2)$$

where $\phi_{VQ}(X) = \mathrm{argmin}_{c \in \{C_j\}} \|x-c\|^2$ returns the closest vector quantization codeword for x; $C \in \mathbb{R}^{d \times m}$ is a vector quantization codebook with m codewords; $C_j$ is its j-th codeword (i.e. the j-th column of C); $\phi_{SQ}$ returns the nearest scalar quantizer from a scalar quantization codebook $w \in \mathbb{R}^p$ with p codewords (equivalent to one-dimensional vector quantization); and the matrix $R \in \mathbb{R}^{d \times d}$ is a learned rotation, applied to the residuals of vector quantization. The product quantizer $\phi_{PQ}(r_x)$ is given by $$\phi_{PQ}(\hat{r}_x) = \begin{pmatrix} \phi_{PQ}^{(1)}(\hat{r}_x^{(1)}) \\ \phi_{PQ}^{(2)}(\hat{r}_x^{(2)}) \\ \vdots \\ \phi_{PQ}^{(K)}(\hat{r}_x^{(K)}) \end{pmatrix}, \hat{r}_x = \begin{pmatrix} \hat{r}_x^{(1)} \\ \hat{r}_x^{(2)} \\ \vdots \\ \hat{r}_x^{(K)} \end{pmatrix}$$

the concatenation of codewords obtained by dividing the rotated and normalized residuals $\hat{r}_x$ into K subvectors $\hat{r}_x^{(k)}$, k=1, 2, ..., K, and quantizing the subvectors independently by vector quantizers $\phi_{PQ}^{(k)}(\cdot)$ to minimize quantization error:

$$\phi_{PQ}^{(k)}(\hat{r}_x^{(k)}) = \mathrm{argmin}_{s \in \{s_j^{(k)}\}} \|s - \hat{r}_x^{(k)}\|^2.$$

$S^{(k)} \in \mathbb{R}^{d^{(k)} \times l}$ is the vector quantization codebook for the k-th subspace (with l codewords). Frequently, $d^{(k)}$, the dimension of the k-th subvector, is simply $$\frac{d}{K},$$

although subvectors of varying size are also possible.

The quantized, normalized residuals are represented by the K indices of $$\phi_{PQ}^{(k)}(\hat{r}_x^{(k)}), k = 1, \ldots, K.$$

This representation has an overall bitrate of $K \log_2 l$, where l is the number of product quantizers in each subspace, and K is the number of subspaces. The residual norms are maintained by organizing the residuals associated with a VQ partition into blocks, where within a block all residuals have the same quantized norm. The blocks are ordered by quantized norm, and thus only the indices of block boundaries must be maintained. The total storage cost is thus O(mp), where m is number of vector quantizers and p is the number of scalar quantizers. For example, if p is set to 8, the total storage cost O(mp) has a negligible effect on recall compared with using unquantized norms.

2.1 Example Efficient Search Under Multiscale Quantization

The multiscale quantization model of the present disclosure can enable a nearest neighbor search to be carried out efficiently. Performing the search can include computing the squared $l_2$ distance of query q with each codeword in the vector quantization codebook C, and searching further within the nearest VQ partition. For example, if the corresponding quantizer is $c_q^* = \mathrm{argmin}_{c \in \{C_j\}} \|q-c\|^2$, and the corresponding quantization partition is $P_q^* = \{x \in X | \phi_{VQ}(x) = c_q^*\}$, then the approximate squared $l_2$ distance between the query and database points in $P_q^*$ are computed using a lookup table. The final prediction can be made by taking the database point with the lowest approximate distance, e.g.

$$x_q^{pred} = \mathrm{argmin}_{x \in P_q^*}$$
$$(\|q - c_q^*\|^2 - 2[R(q - c_q^*)] \cdot [\phi_{SQ}(\|r_x\|)\phi_{PQ}(\hat{r}_x)] + \|\phi_{SQ}(\|r_x\|)\phi_{PQ}(\hat{r}_x)\|^2).$$

Performing the search can include using a lookup table to compute the quantized inner product between subvectors of the query's rotated VQ residual $\bar{q} = R(q - c_q^*)$ and the scaled product quantized datapoint residuals $\phi_{SQ}(\|r_x\|)\phi_{PQ}(\hat{r}_x)$. By letting $\bar{q}^{(k)}$ be the k-th subvector of $\bar{q}$ and $w_x = \phi_{SQ}(\|r_x\|)$ the quantized residual norm, performing the search can include precomputing the inner products and the squared quantized $l_2$ norm with the PQ codebook S as $v_j^{(k)} = -2 \bar{q}^{(k)} \cdot w_x S_j^{(k)} + w_x^2 \|S_j^{(k)}\|^2$ for all j and k, giving K lookup tables $v^{(1)}, \ldots, v^{(K)}$ each of dimension l. Performing the search can then include computing:

$$-2\bar{q} \cdot w_x \phi_{PQ}(r_x) + w_x^2 \|\phi_{PQ}(r_x)\|^2 = \sum_{k=1}^{K} v^{(k)}_{index(\phi_{PQ}^{(k)}(r_x))}$$

In some implementations, performing the search can include using soft vector quantization and searching the t vector quantization partitions with the lowest $\|q-C_j\|_2$, instead of searching only one vector quantization partition. In this case, the final complexity of the search can be $$O\left(\frac{Ndt}{mK}\right).$$

In some implementations, all of the datapoints with the same quantized residual norm can be stored in consecutive blocks. In this case, performing the search can include creating a new lookup table at the beginning of a new block, by combining weight independent lookup tables of $-2 \bar{q}^{(k)} \cdot S_j^{(k)}$ and $\|S_j^{(k)}\|^2$ (weighted by $w_x$ and $w_x^2$, respectively) using hardware optimized fused multiply-add instructions. In this case, a computation cost is incurred only p times for a VQ partition, where p is the number of quantized residual norm values. For example, if p=8 and t=8 (e.g. the number of VQ partitions to check), then a relatively low performance overhead can be maintained.

2.2 Example Optimization Procedure

Training the multiscale quantization model of the present disclosure can include using a stochastic gradient descent to jointly train the parameters of the model (e.g., codebooks, orthogonal transformation, and residual norm quantizers). In order to optimize the orthogonal transformation of vector quantization residuals while maintaining orthogonality, the transformation can be parameterized via the Cayley characterization of orthogonal matrices:

$$R = (I - A)(I + A)^{-1} \quad (3)$$

where A is a skew-symmetric matrix, i.e. $A = -A^T$. In some implementations, equation (3) can be differentiable with respect to the $$\frac{d(d-1)}{2}$$

parameters of A. The gradient can be computed by performing d×d matrix inversions at each iteration. In some implementations, the number of parameters of A can be restricted to trade off capacity and computational cost, when training on high-dimensional datasets.

Training the model can include initializing the codebook for vector quantization using random samples from the dataset, and initializing the codebook for product quantization using the residuals (after vector quantization and rotation) of a set of independent samples. To allow the vector quantization a chance to partition the space, the vector quantization error can be optimized for several epochs before initializing the product codes and doing full joint training. The parameters of the skew-symmetric matrix A can be initialized by sampling from $\mathcal{N}(0, 1e-3)$.

Training the model can include fixing all optimization parameters for all datasets. In some implementations, more extensive per-dataset turning can be performed to improve results. For example, the Adam optimization algorithm can be used with suggested parameters, minibatch sizes of 2000, and a learning rate of 1e-4 during joint training. In some implementations, the learning rate can be set to 1e-3 when training only the vector quantizers.

Training the model can include jointly optimizing the assignment of PQ codes and the scalar quantization of residual norms for all datapoints within a VQ partition. In this way, the model can learn the quantizer for residual norms and capture their local distribution within the VQ partition. Leaving the PQ codebook and rotation fixed, the training can include alternating between the following two steps until convergence:
 1. Fix all assigned PQ codes and scalar quantize the residual norms only within the partition.
 2. Fix all quantized residual norms within the partition and reassign PQ codes.

2.3 Example Technical Effects

The systems and methods described herein provide a number of technical effects and benefits. Systems and methods for enabling the multiscale quantization model of the present disclosure can have a technical effect of minimizing quantization error and substantially improving the recall of a fast similarity search using the model. To scale quantization based search techniques to massive datasets, one strategy is to first vector quantize the input vectors in the original space (coarse quantization), and then apply product quantization on the vector quantization residuals. However, in such a 'VQ-PQ' style approach, the norms of the residuals exhibit significant variance. Accordingly, the multiscale quantization model of the present disclosure can provide significant gains for massive search even when the original data is fully normalized. For example, because real world data is often clusterable, with the diameter of clusters substantially lower than the diameter of the dataset as a whole, the vector quantization can thus be used to obtain a "residual dataset" with much smaller diameter, yielding significant reductions in quantization error when quantized with only a product code.

Additionally, systems and methods for enabling complete end-to-end training to learn the parameters of the multiscale quantization model can have a technical effect of significantly reducing quantization error, as compared to previous training methods that use alternating optimization. For example, by learning a rotation of the VQ residuals, the variance within each PQ subspace can be significantly reduced for many real world datasets such as image datasets, text, web documents, audio, or other forms of data or data structures, yielding substantially lower quantization error and correspondingly higher recall when performing a fast similarity search.

The systems and methods of the present disclosure also provide an improvement to computing technology, such as data matching and retrieval computing technology. For instance, the systems and methods herein enables nearest neighbor search to be carried out efficiently, and with substantial improvements in recall.

3. Example Embodiments

With reference now to the Figures, example embodiments of the present disclosure will be discussed in further detail.

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more multiscale quantization models 120. The multiscale quantization models 120 can be or otherwise include multiple quantizers of different types. For example, the multiscale quantization models 120 can include a vector quantizer, product quantizer, and scalar quantizer. The vector quantizer can quantize a dataset and determine vector quantization residuals. The residuals can be rotated and reparameterized into a direction component and a scale component. The product quantizer can quantize the direction component, and the scalar quantizer can quantize the scale component. In some implementations, the product quantizer and the scalar quantizer can be jointly trained via end to end training process.

In some implementations, the one or more multiscale quantization models 120 can be received from the server computing system 130 over network 180, stored in the user computing device memory 114, and then used or otherwise implemented by the one or more processors 112.

Additionally or alternatively, one or more multiscale quantization models 140 can be included in or otherwise stored and implemented by the server computing system 130 that communicates with the user computing device 102 according to a client-server relationship. For example, the multiscale quantization models 140 can be implemented by the server computing system 140 as a portion of a web service (e.g., a similarity search service). Thus, one or more models 120 can be stored and implemented at the user computing device 102 and/or one or more models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a traditional mouse, a camera, a microphone, or other components by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned multiscale quantization models 140. The multiscale quantization models 140 can be or otherwise include multiple quantizers of different types. For example, the multiscale quantization models 140 can include a vector quantizer, product quantizer, and scalar quantizer. The vector quantizer can quantize a dataset and determine vector quantization residuals. The residuals can be rotated and reparameterized into a direction component and a scale component. The product quantizer can quantize the direction component, and the scalar quantizer can quantize the scale component. In some implementations, the product quantizer and the scalar quantizer can be jointly trained via end-to-end training. Alternatively or additionally, the multiscale quantization models 140 can include other forms of machine-learned models. Example multiscale quantization models 140 and training schemes therefore are discussed with reference to FIGS. 2-5B.

In some implementations, the server computing system 130 can include a search tool 142 that can perform a search based on a quantized dataset and a query. For example, given a query q, the search tool 142 can perform a fast similarity search on a quantized dataset, based on the query, and determine one or more search result(s).

The server computing system 130 can train the multiscale quantization models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120/140 using various training or learning techniques, such as, for example, a stochastic gradient descent framework to minimize the overall quantization error. The model trainer 160 can perform a number of generalization techniques (e.g., weight decays, dropouts, etc.) to improve the generalization capability of the models being trained. In particular, the model trainer 160 can train a multiscale quantization model 120/140 based on a set of training data 162.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 1:
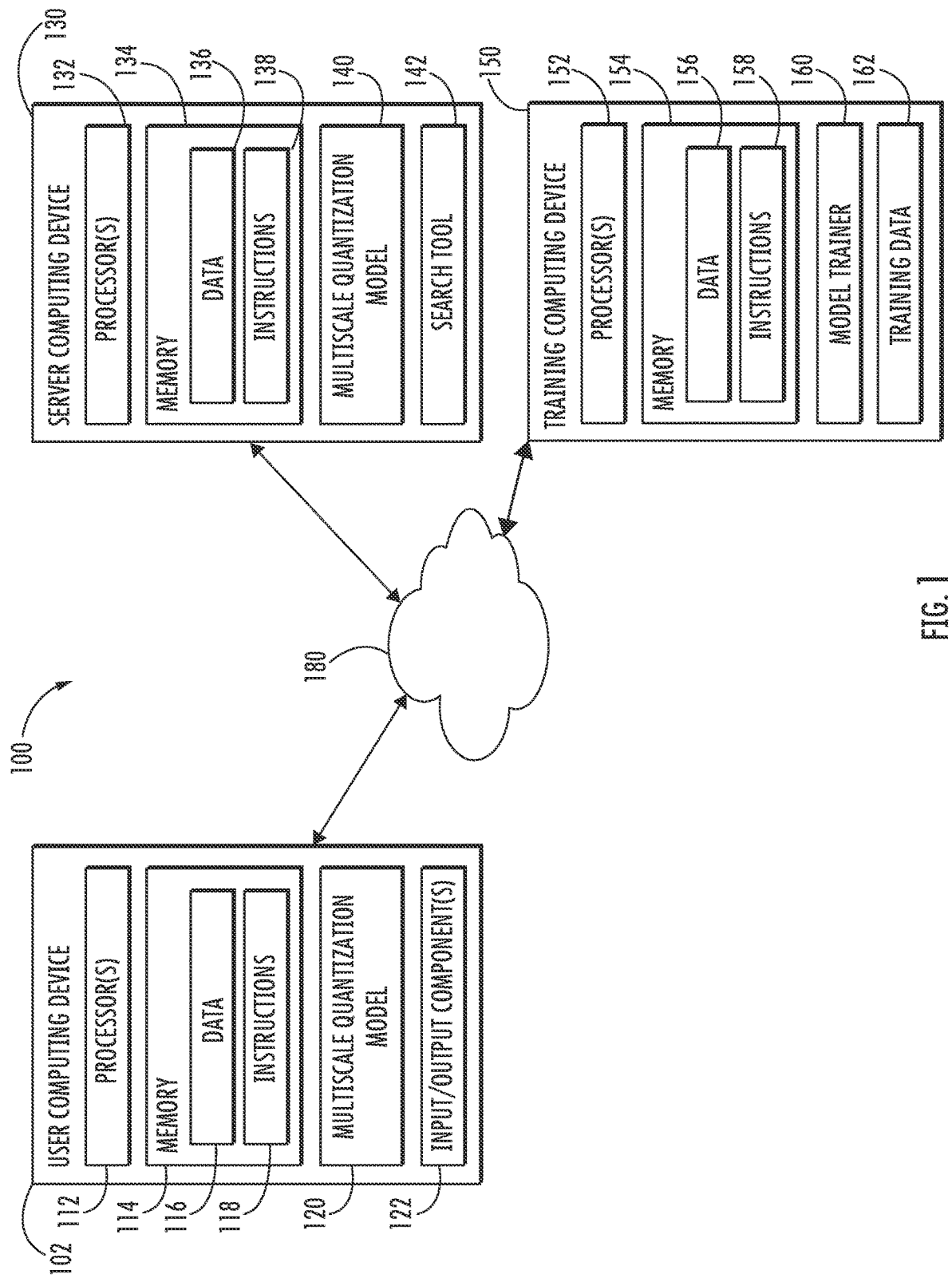
FIG. 1 depicts a block diagram of an example computing system, according to example embodiments of the present disclosure.

FIG. 1 illustrates one example computing system that can be used to implement the present disclosure. Other computing systems can be used as well. For example, in some implementations, the user computing device 102 can include the model trainer 160 and the training dataset 162. In such implementations, the multiscale quantization models 120 can be both trained and used locally at the user computing device 102. In some of such implementations, the user computing device 102 can implement the model trainer 160 to personalize the multiscale quantization models 120 based on user-specific data.

Figure 2:
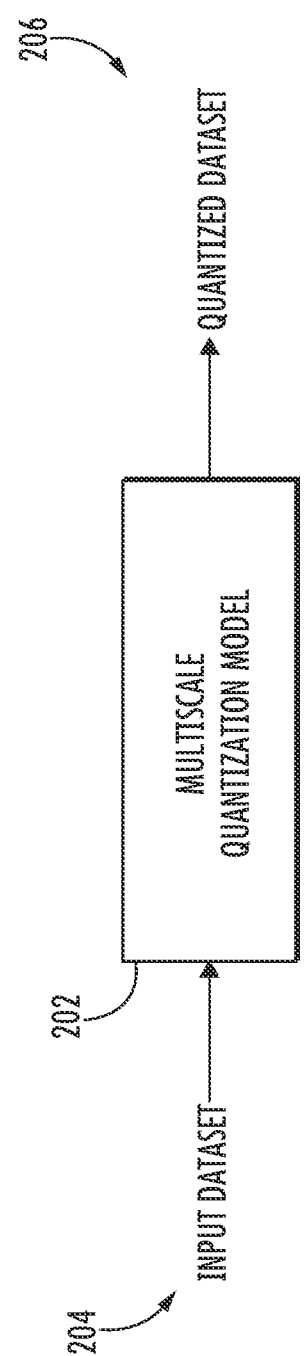
FIG. 2 depicts an example workflow, according to example embodiments of the present disclosure.

FIG. 2 depicts an example workflow according to example embodiments of the present disclosure. In particular, FIG. 2 illustrates a multiscale quantization model 202 that is configured to provide a quantized dataset 206. In particular, the multiscale quantization model 202 can receive an input dataset 204 and, in response, provide a quantized dataset 206 that encodes information descriptive of the input dataset 204.

Although an image 206 is provided as an example type of data that can be quantized using the multiscale quantization model 202, other data types can be quantized as well, including, for example, text, web documents, audio, or other forms of data or data structures.

Figure 3:
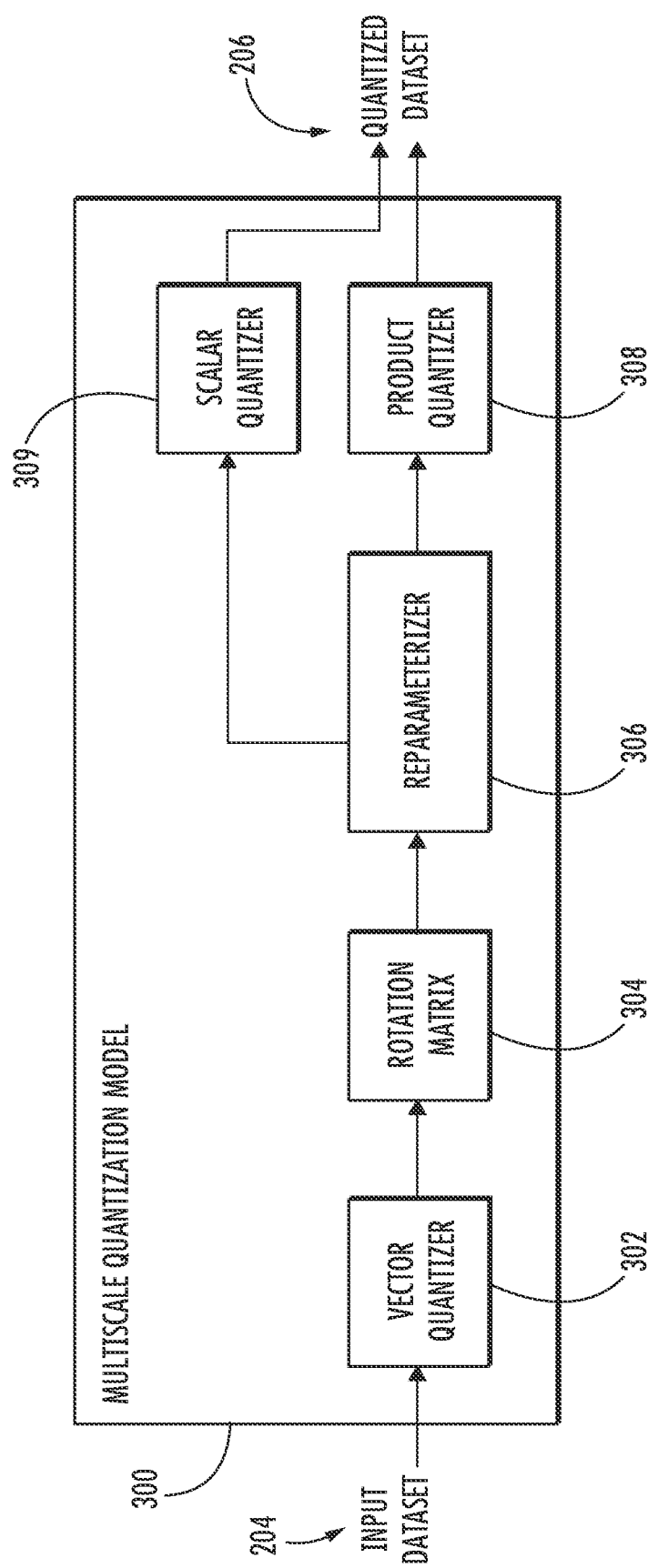
FIG. 3 depicts an example multiscale quantization model, according to example embodiments of the present disclosure.

FIG. 3 depicts an example multiscale quantization model 300 according to example embodiments of the present disclosure. FIG. 3 depicts one example model structure. Other structures can be used in addition or alternatively to the structure illustrated in FIG. 3. The multiscale quantization model 300 includes a vector quantizer 302, a rotation matrix 304, a reparameterizer 306, a product quantizer 308, a scalar quantizer 309, and a scaler 310.

The vector quantizer 302 can perform vector quantization on the input dataset 204 to generate a residual dataset.

The rotation matrix 304 can be a learned rotation of the vector quantized residuals in the residual dataset, and the multiscale quantization model 300 can apply the rotation matrix 304 to the residual dataset to generate a rotated residual dataset that includes a plurality of rotated residuals.

The reparameterizer 306 performs reparameterization of each rotated residual in the rotated residual dataset into a direction component and a scale component.

The product quantizer 308 performs product quantization of the direction components of the plurality of rotated residuals.

The scalar quantizer 309 performs scalar quantization of the scale components of the plurality of rotated residuals.

3.1 Example Multiscale

According to an aspect of the present disclosure, adding the scalar quantizer 309 further increases the recall when the norms of the residuals have large variability. For a query q, the $l_2$ error is $$\left| \|q-x\|^2 - \|q-\tilde{x}\|^2 \right| =$$

$$\left| -2q \cdot (x - \tilde{x}) + \|x\|^2 - \|\tilde{x}\|^2 \right| \leq |-2q \cdot (x - \tilde{x})| + \left| \|x\|^2 - \|\tilde{x}\|^2 \right|.$$

Taking expectation with respect to q yields $$\mathbb{E}_q |-2q \cdot (x-\tilde{x})| \leq 2\sqrt{\mathbb{E}_q[(x-\tilde{x})^T qq^T (x-\tilde{x})]} = 2\sqrt{(x-\tilde{x})^T \mathbb{E}_q(qq^T)(x-\tilde{x})},$$

where the inequality follows from Jensen's inequality. If $\lambda_q$ is the largest eigen value of the covariance matrix $\mathbb{E}_q(qq^T)$, then $$\mathbb{E}_q \big| \|q-x\|^2 - \|q-\tilde{x}\|^2 \big| \le 2\sqrt{\lambda_q}\, \|x-\tilde{x}\| + \big| \|x\|^2 - \|\tilde{x}\|^2 \big|.$$

Existing quantization methods have focused on the first term in the error of $l_2$ distance. However for VQ residuals with large variability in $\|x\|$, the second quadratic term becomes dominant. By scalar quantizing the residual norm, especially within each VQ partition locally, the second term can be reduced substantially and thus recall on real datasets can be improved.

3.2 Example Rotation Matrix

Performing quantization after a learned rotation has been found to work well in practice. The rotation is required in some scenarios. For example, let $x_i = Ry_i$, $1 \le i \le n$, then there exist simple examples where the $y_i$'s have a product code with small codebook size and MSE 0, whereas to get any small mean squared error on $x_i$s one may need to use exponentially many codewords. On real-world datasets, this difference might not be quite so pronounced, but it is still significant and hence undoing the rotation can yield significantly better MSE. We provide the following Lemma.

Lemma 1. Let X=RY, i.e., for $1 \le i \le n$, $x_i = Ry_i$. There exists a dataset Y and a rotation matrix R such that a canonical basis product code of size 2 is sufficient to achieve MSE of 0 for Y, whereas any product code on X requires $2^{c \cdot min(d/K, K)\varepsilon}$ codewords to achieve MSE $\varepsilon \|x\|_{max}$, where c is some universal constant and $\|x\|_{max}$ is the maximum $l_2$ norm of any point.

3.3 Example Coarse Quantization

The proposed vector and product quantization is analyzed when the data is generated by a K-subspace mixture model that captures two properties observed in many real-world datasets: samples belong to one of several underlying categories, also referred to as components, and within each component the residuals are generated independently in K subspaces.

For example, given a query q, let $x_q^*$ be the sample that minimizes $\|q-x\|_2$. Let $x_q^{VQ}$ be the output of the hierarchical nearest neighbor algorithm that first finds the nearest cluster center and then searches within that cluster. If q is generated independently of x, then with high probability it returns an $x_q^{VQ}$ that is near-optimal.

Theorem 1. Given n samples from an underlying K-subspace mixture model that has been clustered correctly and an independently generated query q, with probability $\ge 1-\delta$, $$\big\| q-x_q^* \big\|_2^2 - \big\| q-x_q^{VQ} \big\|_2^2 \le 8b \sqrt{\frac{dr^2}{2K}\log\frac{4n}{\delta}} + 4r^2 \sqrt{\frac{d^2}{2K}\log\frac{2n}{\delta}}.$$

4.1 Example Evaluation Datasets

The performance of certain end-to-end trained multiscale quantization (MSQ) models of the present disclosure has been evaluated on the SIFT-1M and DEEP-10M datasets, which are often used in benchmarking the performance of nearest neighbor search. SIFT-1M contains 1 million, 128 dimensional SIFT descriptors extracted from Flickr images. DEEP-10M contains 96 PCA components extracted from the final hidden layer activations of GoogLeNet.

At training time, each dataset is indexed with 1024 VQ coarse quantizers. At query time, quantized residuals from the 8 partitions closest to the query are further searched using ADC to generate the final nearest neighbors.

4.2 Example Ablation Tests

Compared to IVFADC, which uses plain PQ with coarse quantizers, an example implementation of the end-to-end trained MSQ described herein was demonstrated to reduce quantization error by 15-20% on SIFT-1M, and 20-25% on Deep-10M, which is a substantial reduction. Multiple components contribute to this reduction: (1) learned rotation of the VQ residuals; (2) separate quantization of the residual norms into multiple scales; and (3) end-to-end training of all parameters.

FIG. 5A depicts a plot of the MSE reduction relative to IVFADC for several ablation tests, to show the effect of each component. In particular, on Deep-10M, the proposed multiscale approach and the end-to-end learning contribute an additional 5-10% MSE reduction on top of learned rotation, while they contribute 10-15% on SIFT-1M. It is important to note that on SIFT-1M, multiscale quantization and end-to-end training have a bigger impact than learned rotation, which is itself often considered to yield a significant improvement.

4.3 Example Recall Experiments

Example implementations of the end-to-end trained multiscale quantization technique described herein have been compared with three baselines techniques: product quantization (PQ), optimized product quantization (OPQ) and stacked quantizers (SQ). Ground-truth results were generated using brute force search, and the results of each technique can be compared against ground-truth in fixed-bitrate settings.

For fixed-bitrate experiments, recall curves for varying numbers of PQ codebooks from can range {8,16,32} for the SIFT1M dataset and {6,12,24} for the DEEP10M dataset. For each number of codebooks, experiments were conducted with both 16 centers for in-register table lookup and 256 centers for in-memory table lookup in FIGS. 6 and 7. From the recall curves, the multiscale quantization performs better than all baselines across both datasets in all settings.

4.4 Example Speed Benchmarks

The same indexing structure (IVF), and the same ADC computation implementation is used for all baselines (PQ, OPQ, SQ). Thus the speed of all baselines are essentially the identical at the same bitrate, meaning FIGS. 6 and 7 are both fixed-memory and fixed-time, and thus directly comparable. For codebooks with 256 centers, in-memory lookup table (LUT256) is implemented; for codebooks with 16 centers, in-register lookup table (LUT16) is implemented is implemented using the VPSHUFB instruction from AVX2, which performs 32 lookups in parallel.

Also, different computations reported in the literature (e.g., Hamming distance computations, ADC computations using in-memory lookup tables, and ADC computations using SIMD registers) are placed on equal footing and a comparison of the different approaches is provided. For instance, FIG. 5B depicts the time on distance computation at the same bitrate. The VPSHUFB based LUT16 has almost the same speed compared to POPCNT based Hamming, and they are both 5× faster than in-memory based ADC. As an anecdote, when the number of neighbors to be retrieved is large, Recall1@N of LUT256 and LUT16 is often comparable at same bitrate in practice, and LUT16 with 5× speed up is almost always preferred.

5. Example Advantages

According to an aspect of the present disclosure, the end-to-end trainable multiscale quantization model minimizes overall quantization loss. A novel scalar quantization approach to account for the variances in datapoint norms is introduced, which is both empirically and theoretically motivated. Together with the end-to-end training, this contributes to large reduction in quantization error over existing competing methods that already employ optimized rotation and coarse quantization. In addition, comprehensive nearest neighbor search retrieval experiments on two large-scale, publicly available benchmark datasets, show considerable improvement over state-of-the-art.

6. Example Methods

FIG. 8 depicts a flow chart diagram of an example method 800 to obtain a quantized dataset according to example embodiments of the present disclosure.

At 801, a computing system can obtain and vector quantizes a first dataset. For example, the vector quantizer 302 can vector quantize an input dataset (e.g., first dataset).

At 802, the computing system can generate a residual dataset from the vector quantized first dataset. For example, the vector quantizer 302 can generate the residual dataset.

At 803, the computing system can generate a rotated residual dataset. For example, the rotation matrix 304 can be learned and applied to the residual dataset to generate the rotated residual dataset.

At 804, the rotated residuals can be reparameterized into a direction component and a scale component. For example, the reparameterizer 306 can reparameterize the rotated residual dataset into a direction component and a scale component.

At 805, the direction component can be product quantized. For example, the product quantizer 308 can obtain the direction component from the reparameterizer 306, and perform product quantization on the direction component.

At 806, the scale component can be scalar quantized. For example, the scalar quantizer 309 can obtain the scale component from the reparameterizer 306, and perform scalar quantization on the scale component.

FIG. 9 depicts a flow chart diagram of an example method 900 to perform a search using a multiscale quantization model.

At 901, a computing system can receive a query.

At 902, the computing system can perform a nearest neighbor search based on the query. The computing system can perform the search on a multiscale quantized database. For example, given a query q, the computing system can compute the squared $l_2$ distance of the query q with each codeword in the vector quantization codebook C, and search further within the nearest VQ partition. If the corresponding quantizer is $c_q^* = \operatorname{argmin}_{c \in \{C_j\}} \|q-c\|^2$, and the corresponding quantization partition is $P_q^* = \{x \in X | \phi_{VQ}(x) = c_q^*\}$, then the approximate squared $l_2$ distance between the query and database points in $P_q^*$ can be computed using a lookup table. The final prediction can be made by taking the database point with the lowest approximate distance, e.g.

$$x_q^{pred} = \operatorname{argmin}_{x \in P_q^*}$$

$$(\|q - c_q^*\|^2 - 2[R(q - c_q^*)] \cdot [\phi_{SQ}(\|r_x\|)\phi_{PQ}(\hat{r}_x)] + \|\phi_{SQ}(\|r_x\|)\phi_{PQ}(\hat{r}_x)\|^2).$$

The computing system can use a lookup table to compute the quantized inner product between subvectors of the query's rotated VQ residual $\bar{q} = R(q-c_q^*)$ and the scaled product quantized datapoint residuals $\phi_{SQ}(\|r_x\|)\phi_{PQ}(\hat{r}_x)$. The computing system can determine $\bar{q}^{(k)}$ to be the k-th subvector of $\bar{q}$ and $w_x = \phi_{SQ}(\|r_x\|)$ the quantized residual norm, and can precompute the inner products and the squared quantized $l_2$ norm with the PQ (k) codebook S as $v_j^{(k)} = -2\bar{q}^{(k)} \cdot w_x S_j^{(k)} + w_x^2 \|S_j^{(k)}\|^2$ for all j and k, giving K lookup tables $v^{(1)}, \ldots, v^{(K)}$ each of dimension l. The computing system can then compute $$-2\bar{q} \cdot w_x \phi_{PQ}(r_x) + w_x^2 \|\phi_{PQ}(r_x)\|^2 = \sum_{k=1}^{K} v_{index(\phi_{PQ}^{(k)}(r_x))}^{(k)}.$$

However, in some implementations, the query is not quantized and the search can be performed based on the query without quantization of the query.

In some implementations, the computing system can perform the search using soft vector quantization and searching the t vector quantization partitions with the lowest $\|q-C_j\|_2$, instead of searching only one vector quantization partition, or based on the unquantized query.

At 903, the computing system can obtain the search results. For example, the computing system can obtain one or more nearest neighbors of the query represented in the multiscale quantized database.

FIG. 10 depicts a flow chart diagram of an example method 1000 to train a multiscale quantization model according to example embodiments of the present disclosure.

At 1001, a computing system can obtain a quantization model.

At 1002, the computing system can determine a gradient of an objective function. For example, a stochastic gradient descent can be used to jointly train the parameters of the quantization model (e.g., codebooks, orthogonal transformation, and residual norm quantizers).

At 1003, the computing system can jointly train parameters of the quantization model based on the gradient. For example, to learn the quantizer for residual norms and capture their local distribution with a VQ partition, the assignment of PQ codes and the scalar quantization of residual norms for all datapoints within a VQ partition can be jointly optimized. Leaving the PQ codebook and rotation fixed, the training can include alternating between 1) fixing all assigned PQ codes and scalar quantizing the residual norms only within the partition, and 2) fixing all quantized residual norms within the partition and reassigning PQ codes, until convergence.

7. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for operating a search engine that is associated with a database that includes a set of items and a rotated residual dataset that includes a set of rotated residuals corresponding to the set of items, the method comprising:
    receiving, at a computing system, a search query;
    performing, at the computing system, a nearest neighbor search over a quantized encoding of the database based on the search query, wherein each rotated residual of the set of rotated residuals includes a unit-normalized direction component and a scale component, the unit-normalized direction component of each rotated residual being normalized such that a variance of norms of the rotated residual dataset is reduced, and the quantized encoding of the database is based on a quantization of the unit-normalized direction component and a quantization of the scale component of each rotated residual of the set of rotated residuals; and
    obtaining, at the computing system, search results based on the nearest neighbor search over the quantized encoding of the database, wherein the search results include an indication of at least a first item of the set of items.

2. The computer-implemented method of claim 1, further comprising:
    providing, by the computing system, the search results to another computing system that provided the search query.

3. The computer-implemented method of claim 1, further comprising:
    performing, at the computing system, a vector quantization of the database;
    generating, at the computing system, a residual dataset based at least in part on a result of the vector quantization of the database; and
    generating, at the computing system, the rotated residual dataset based on the residual dataset.

4. The computer-implemented method of claim 3, wherein generating the rotated residual dataset comprises:
    applying, at the computing system, a rotation matrix to the residual dataset to generate the rotated residual dataset.

5. The computer-implemented method of claim 3, wherein the vector quantization of the database is based at least in part on a vector quantization codebook.

6. The computer-implemented method of claim 1, further comprising:
    for each rotated residual of the set of rotated residuals, generating, at the computing system, each of unit-normalized direction component and the scale component for the rotated residual based on a reparameterization of the rotated residual.

7. The computer-implemented method of claim 1, further comprising:
    for each rotated residual of the set of rotated residuals, generating, at the computing system, the quantization of the unit-normalized component of the rotated residual based on a product quantization of the unit-normalized direction component of the rotated residual.

8. The computer-implemented method of claim 7, wherein the product quantization of the unit-normalized direction component of the rotated residual is based on a concatenation of codewords obtained by dividing the rotated residual into one or more subvectors that are independently quantized by a plurality of vector quantizers.

9. The computer-implemented method of claim 7, wherein the product quantization of the unit-normalized direction component of each rotated residual of the set of rotated residuals is based at least in part on a product quantization codebook.

10. The computer-implemented method of claim 1, wherein the set of rotated residuals are organized into blocks such that within a block all rotated residuals have a same quantized norm.

11. The computer-implemented method of claim 1, further comprising:
    for each rotated residual of the set of rotated residuals, generating, at the computing system, the quantization of the scale component of the rotated residual based on a scalar quantization of the scale component of the rotated residual.

12. The computer-implemented method of claim 1, wherein performing the nearest neighbor search over the quantized encoding of the database comprises performing, at the computing system, an asymmetric search.

13. The computer-implemented method of claim 12, wherein performing the asymmetric search comprises performing, ay the computing system, a scalar multiplication of a product quantizer codebook once per scalar quantizer.

14. The computer-implemented method of claim 1, wherein a data type is associated with each item of the set of items.

15. The computer-implemented method of claim 1, wherein each item of the set of items is associated with data selected from the group consisting of: an image, a text portion, a web document, audio, and video.

16. The computer-implemented method of claim 1, further comprising:
    for each rotated residual of the set of rotated residuals, generating, at the computing system, the unit-normalized direction component for the rotated residual by dividing the rotated residual by a norm of an un-normalized direction component for the rotated residual, and wherein the scale component for each rotated residual comprises its norm.

17. The computer-implemented method of claim 16, further comprising:
    for each rotated residual of the set of rotated residuals, generating, at the computing system, the scale component for the rotated residual based on the norm of the un-normalized direction component for the rotated residual.

18. The computer-implemented method of claim 1, wherein the quantization of the scale component of each of the rotated residuals of the set of rotated residuals is based at least in part on a scalar quantization codebook.

19. A computer system, comprising:
one or more processors; and
one or more non-transitory computer-readable media that, when executed by the one or more processors, cause the computer system to perform operations for operating a search engine that is associated with a database that includes a set of items and a rotated residual dataset that includes a set of rotated residuals corresponding to the set of items, the operations comprising:
receiving a search query;
performing a nearest neighbor search over a quantized encoding of the database based on the search query, wherein each rotated residual of the set of rotated residuals includes a unit-normalized direction component and a scale component, the unit-normalized direction component of each rotated residual being normalized such that a variance of norms of the rotated residual dataset is reduced, and the quantized encoding of the database is based on a quantization of the unit-normalized direction component and a quantization of the scale component of each rotated residual of the set of rotated residuals; and
obtaining search results based on the nearest neighbor search over the quantized encoding of the database, wherein the search results include an indication of at least a first item of the set of items.

20. A non-transitory computer readable storage medium storing instructions that, when executed by a processor device, cause the processor device to perform operations for operating a search engine that is associated with a database that includes a set of items and a rotated residual dataset that includes a set of rotated residuals corresponding to the set of items, the operations comprising:
receiving a search query;
performing a nearest neighbor search over a quantized encoding of the database based on the search query, wherein each rotated residual of the set of rotated residuals includes a unit-normalized direction component and a scale component, the unit-normalized direction component of each rotated residual being normalized such that a variance of norms of the rotated residual dataset is reduced, and the quantized encoding of the database is based on a quantization of the unit-normalized direction component and a quantization of the scale component of each rotated residual of the set of rotated residuals; and
obtaining search results based on the nearest neighbor search over the quantized encoding of the database, wherein the search results include an indication of at least a first item of the set of items.

* * * * *